United States Patent
Biddulph et al.

(10) Patent No.: US 12,526,579 B2
(45) Date of Patent: Jan. 13, 2026

(54) GRAPHENE TRANSDUCER

(71) Applicant: Paragraf Limited, Somersham (GB)

(72) Inventors: Phillip David Biddulph, Somersham (GB); Alexander David Lambert, Somersham (GB); Benjamin Scarrow, Somersham (GB)

(73) Assignee: PARAGRAF LIMITED, Somersham (GB)

( * ) Notice: Subject to any disclaimer, the term of this patent is extended or adjusted under 35 U.S.C. 154(b) by 258 days.

(21) Appl. No.: 18/561,992

(22) PCT Filed: May 17, 2022

(86) PCT No.: PCT/EP2022/063321
§ 371 (c)(1),
(2) Date: Nov. 17, 2023

(87) PCT Pub. No.: WO2022/243317
PCT Pub. Date: Nov. 24, 2022

(65) Prior Publication Data
US 2024/0373169 A1    Nov. 7, 2024

(30) Foreign Application Priority Data

May 18, 2021    (GB) ..................................... 2107082

(51) Int. Cl.
*H04R 9/06* (2006.01)
*H04R 9/04* (2006.01)
(Continued)

(52) U.S. Cl.
CPC .............. *H04R 9/046* (2013.01); *H04R 9/06* (2013.01); *H04R 9/08* (2013.01); *H04R 23/002* (2013.01); *H04R 23/008* (2013.01)

(58) Field of Classification Search
CPC ...... H04R 23/00; H04R 23/02; H04R 23/002; H04R 23/004; H04R 23/008; H04R 9/046;
(Continued)

(56) References Cited

U.S. PATENT DOCUMENTS 9,900,698 B2 * 2/2018 Luzzato .............. B29C 45/0001
12,126,981 B1 * 10/2024 Mettler .................... H04R 9/06
(Continued)

FOREIGN PATENT DOCUMENTS

WO    2015064871 A1    5/2015

OTHER PUBLICATIONS

Anonymous, "Partnership Shows Off Graphene Hall Effect Sensor," Jun. 11, 2020, Retrieved from Internet Aug. 17, 2022: https://www.electronicspecifier.com/products/sensors/partnership-shows-off-graphene-hall-effect-sensor, 2 pages.
(Continued)

*Primary Examiner* — Huyen D Le
(74) *Attorney, Agent, or Firm* — Stinson LLP

(57) ABSTRACT

A transducer comprising a primary element comprising a magnet configured to provide a magnetic field within a magnetic zone, the magnetic field extending in a magnetic field direction; a secondary element comprising a first graphene sheet located within the magnetic zone; a static portion; and a rotating portion configured to rotate about an axis of rotation relative to the static portion. The rotating portion comprises a first one of a set comprising the primary element and the secondary element; and wherein the static portion comprises a second one of the set; and wherein an axis of rotation of the rotating portion is such that: in a first position of the static portion relative to the rotating portion, the first graphene sheet lies in a first plane that is parallel to the magnetic field direction; and in a second position of the
(Continued)

static portion relative to the rotating portion, the first graphene sheet lies in an offset plane that is at an angle to the first plane about the axis of rotation. On deployment of the transducer in a first mode, movement of the rotating portion relative to the static portion causes an electrical potential to be generated in the first graphene sheet thereby converting rotational kinetic energy into electrical potential; and/or on deployment of the transducer in a second mode, electrical potential in the first graphene sheet causes rotation of the rotating portion relative to the static portion thereby converting electrical potential into rotational kinetic energy.

18 Claims, 18 Drawing Sheets

(51) Int. Cl.
*H04R 9/08* (2006.01)
*H04R 23/00* (2006.01)

(58) Field of Classification Search
CPC . H04R 9/06; H04R 9/08; G01H 11/02; B06B 1/0292
See application file for complete search history.

(56) References Cited

U.S. PATENT DOCUMENTS

| 2014/0285047 | A1 | 9/2014 | McCrady |
| 2015/0280540 | A1 | 10/2015 | McCrady |
| 2016/0157022 | A1* | 6/2016 | Zhou .................... H04R 29/001 381/191 |
| 2016/0280075 | A1 | 9/2016 | McCrady |
| 2018/0063648 | A1 | 3/2018 | Lin et al. |

OTHER PUBLICATIONS

International Search Report and Written Opinion for PCT/EP2022/063321, mailed Sep. 1, 2022, 10 pages.
Search Report for GB2107082.6, dated Jul. 21, 2021, 4 pages.

* cited by examiner

GRAPHENE TRANSDUCER

REFERENCE TO RELATED APPLICATIONS

This application is a 371 U.S. National Stage application of International Patent Application No. PCT/EP2022/063321, filed May 17, 2022, which claims the benefit of United Kingdom Application No. GB 2107082.6, filed May 18, 2021, the entire disclosures of which are incorporated herein by reference.

BACKGROUND

Graphene is an allotrope of carbon consisting of a single layer of atoms arranged in a two-dimensional honeycomb lattice. Charge carrier behaviour within graphene is influenced by the presence of a magnetic field.

As such, if a current flows through graphene in a first direction in the plane of the graphene it is possible to use a magnetic field to influence the current density profile in a second direction in the plane of the graphene, perpendicular to the first direction. When the magnetic field lines are parallel to the plane of the graphene (referred to in this document as $\alpha=0°$), there is no influence on the current density profile. The influence on the current density profile is greatest when the magnetic field lines are orthogonal to the plane of the graphene (referred to as $\alpha=90°$). However, the sensitivity to change is greatest at $\alpha=0°$ and lowest at $\alpha=90°$. To generalise, absolute signal strength is proportional to $\sin(\alpha)$ while change in signal strength is proportional to $\cos(\alpha)$.

It is known to deploy these properties of graphene in the context of a Hall-effect sensor.

SUMMARY

Against this background there is provided a graphene-based transducer capable of converting rotational kinetic energy into electrical potential and/or of converting electrical potential into rotational kinetic energy.

The transducer comprises:
a primary element comprising a magnet configured to provide a magnetic field within a magnetic zone, the magnetic field extending in a magnetic field direction;
a secondary element comprising a first graphene sheet located within the magnetic zone;
a static portion; and
a rotating portion configured to rotate about an axis of rotation relative to the static portion;
wherein the rotating portion comprises a first one of a set comprising the primary element and the secondary element; and wherein the static portion comprises a second one of the set; and
wherein an axis of rotation of the rotating portion is such that:
in a first position of the static portion relative to the rotating portion, the first graphene sheet lies in a first plane that is parallel to the magnetic field direction; and
in a second position of the static portion relative to the rotating portion, the first graphene sheet lies in an offset plane that is at an angle to the first plane about the axis of rotation;
such that:
on deployment of the transducer in a first mode, movement of the rotating portion relative to the static portion causes an electrical potential to be generated in the first graphene sheet thereby converting rotational kinetic energy into electrical potential; and/or
on deployment of the transducer in a second mode, electrical potential in the first graphene sheet causes rotation of the rotating portion relative to the static portion thereby converting electrical potential into rotational kinetic energy.

The transducer may be deployed as an audio transducer, either in a microphone mode or a speaker mode.

The transducer may be deployed as a rotational encoder or a precision motor.

Since graphene is able to operate reliably at extremes of temperature and has a degree of immunity to radiation, the transducer is operable at high accuracy and in extreme conditions such as on spacecraft or on instruments for use on other planets or satellites.

Extremes of temperature in which the transducer is operable include cryogenic temperatures. This includes temperatures that are below $-150°$ C.

Furthermore, since a graphene sheet is two-dimensional, there is no generation of electrical potential due to any magnetic field in the plane of the graphene.

In some embodiments, the secondary element further comprises a second graphene sheet (a second transducer element) having a fixed position relative to the first graphene sheet (a first transducer element), wherein the second graphene sheet lies in a second plane and wherein the first and second planes are offset with respect to one another about the axis of rotation.

In this way, the first and second transducer elements may together contribute to a higher precision transducer.

In some embodiments, the secondary element further comprises a third graphene sheet (a third transducer element) having a first position relative to the first and second graphene sheets, wherein the third graphene sheet lies in a third plane.

In this way, the first, second and third second transducer elements may together contribute to a higher precision transducer.

In some embodiments, a cross-section through the first, second and third planes forms a delta formation centred on the axis of rotation and, optionally,
the first graphene sheet is offset from the second graphene sheet by an angle of 60°;
the second graphene sheet is offset from the third graphene sheet by an angle of 60°; and
the third graphene sheet is offset from the first graphene sheet by an angle of 60°.

In other embodiments, a cross-section through the first, second and third planes forms a star formation centred on the axis of rotation and, optionally,
the first graphene sheet is offset from the second graphene sheet by an angle of 120°;
the second graphene sheet is offset from the third graphene sheet by an angle of 120°; and
the third graphene sheet is offset from the first graphene sheet by an angle of 120°.

In some embodiments the transducer is an audio transducer and further comprises:
a diaphragm having a rest position and configured to vibrate about the rest position in response to sound waves;
a mechanical linkage between the diaphragm and the rotating portion;
such that:
the rotating portion rotates in response to deviation of the diaphragm from the rest position; and the diaphragm deviates from the rest position on rotation of the rotating portion.

In some embodiments, the transducer comprises:
a current driver configured to supply a current to the graphene sheet in a first direction; and
a reader circuit configured to read a potential difference across the graphene sheet in a second direction perpendicular to the first direction and provide an output signal.

Where present, the current driver may be an AC current driver or a DC current driver. A DC current driver may be preferable. For an AC current driver, a suitable frequency of the AC current may be 50 Hz.

Alternatively, the transducer comprises:
a voltage driver configured to apply a voltage across the graphene sheet in a first direction; and
a reader circuit configured to read a potential difference across the graphene sheet in a second direction perpendicular to the first direction and provide an output signal.

Where present, the voltage driver may be an AC voltage driver or a DC voltage driver. An AC voltage driver may provide +/−50 V, for example. A DC voltage driver may operate at 75 V, for example.

Optionally, the reader circuit comprises an amplifier configured to amplify the output signal.

Optionally, the transducer comprises an analogue digital converter configured to convert the output signal to a digital output signal.

Optionally, the transducer comprises a current driver circuit and a reader circuit for each of the graphene sheets (transducer elements) wherein each reader circuit provides its respective output signal.

Alternatively, the transducer comprises a voltage driver and a reader circuit for each of the graphene sheets (transducer elements), wherein each reader circuit provides its respective output signal.

Optionally, the transducer comprises a processor configured to process the respective output signals in order to resolve a unique angle of each of the graphene sheets relative to the magnetic field direction.

The current driver may be configured to supply a current of between 10 pA and 100 mA, preferably between 10 pA and 50 mA, and more preferably between 0.01 mA and 0.5 mA. This supply current may be AC or DC. If AC, a frequency of 50 Hz may be used.

The magnetic field may have a magnetic field strength of between −30 T and 30 T, preferably between −1.0 T and 1.0 T.

In an audio transducer application, the magnetic field may have a magnetic field strength in the region of 0.3 T.

FIGURES

Specific embodiments of the invention will now be described with reference to the accompanying drawings in which:

FIG. 1 provides a schematic view that shows the distribution of current flowing in a graphene sheet that is not subject to a magnetic field;

FIG. 2 provides a schematic view that shows the distribution of current flowing in the graphene sheet of FIG. 1 when subject to a magnetic field orthogonal to the plane of the graphene sheet (which is the angle at which the influence of the magnetic field on current density profile is greatest but the sensitivity to change is least);

Figure 1:
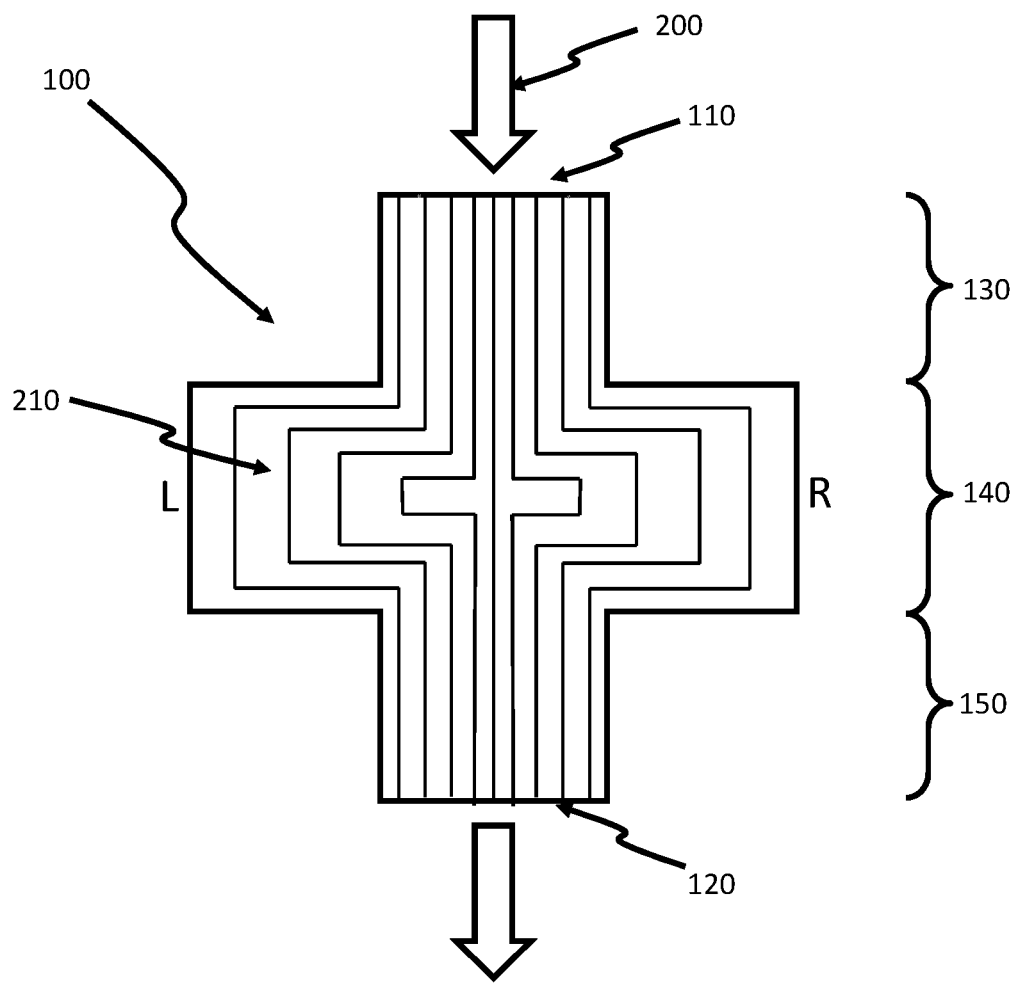
Figure 5:
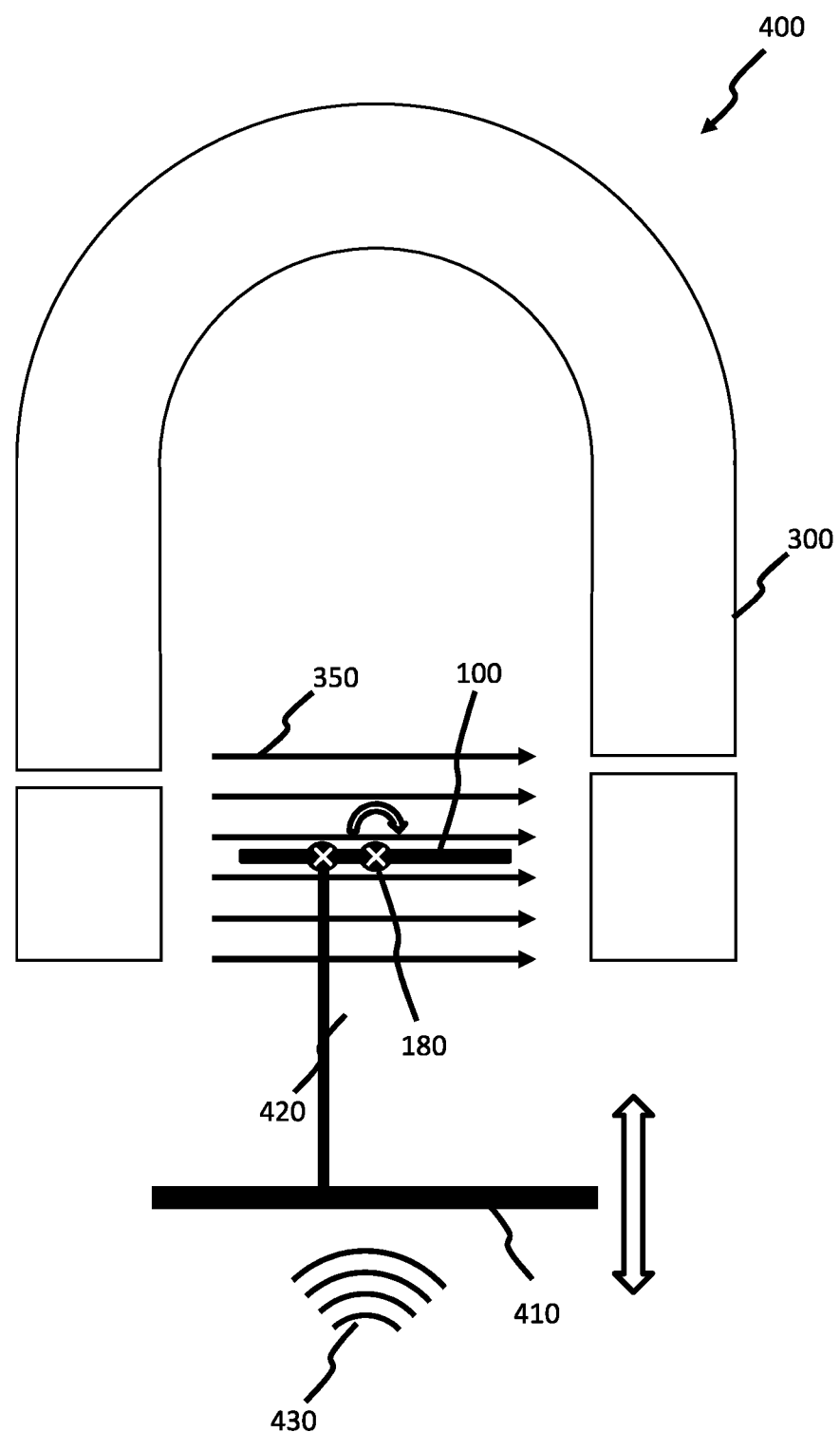
FIG. 5 shows a schematic view of an embodiment of a transducer comprising the graphene sheet arrangement shown in FIG. 4 and deployed as an audio transducer, specifically a microphone.
Figure 6:
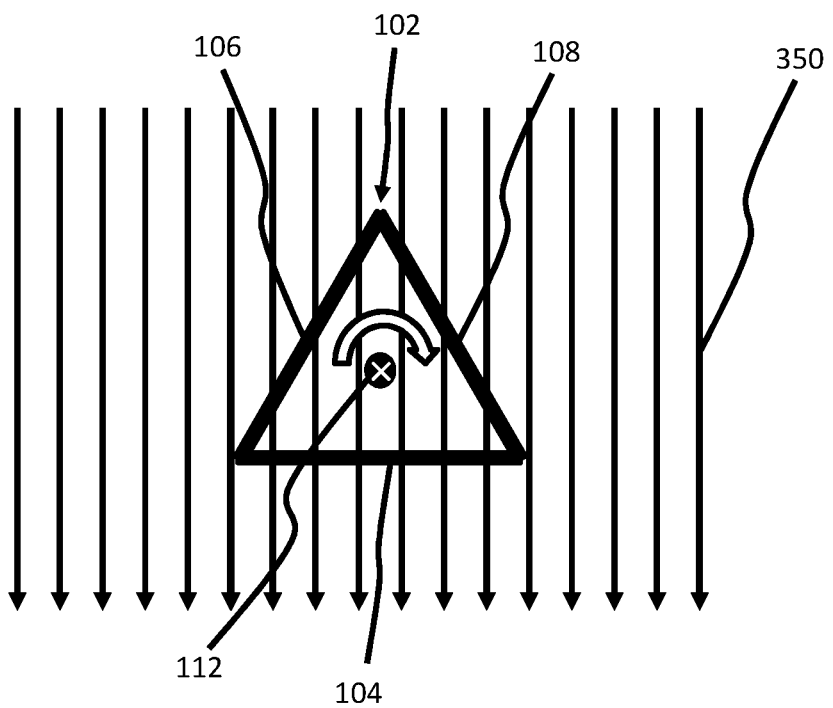
Figure 7:
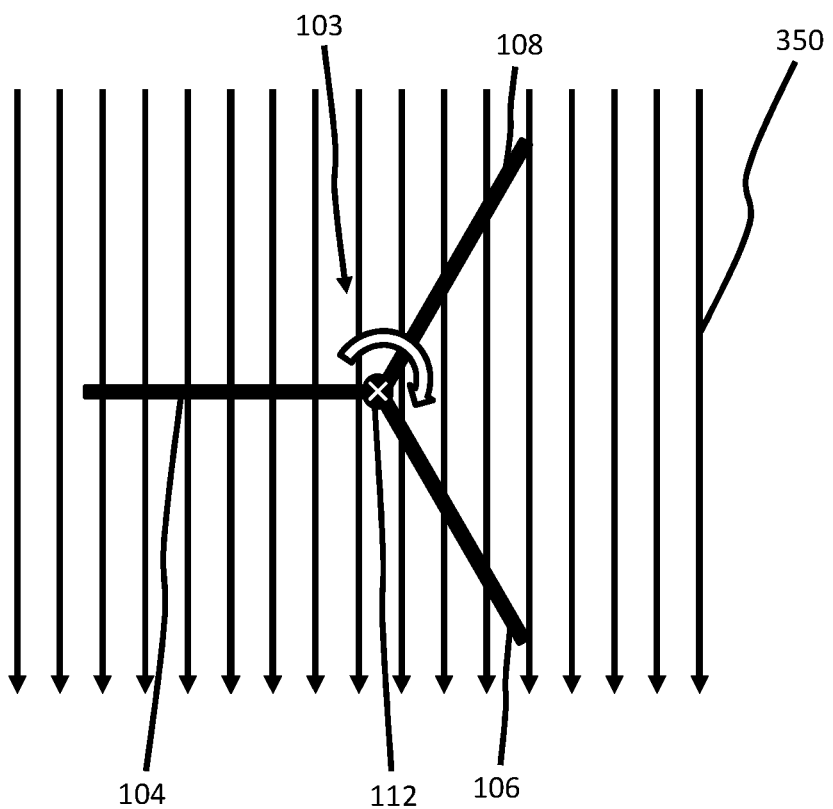
Figure 8:
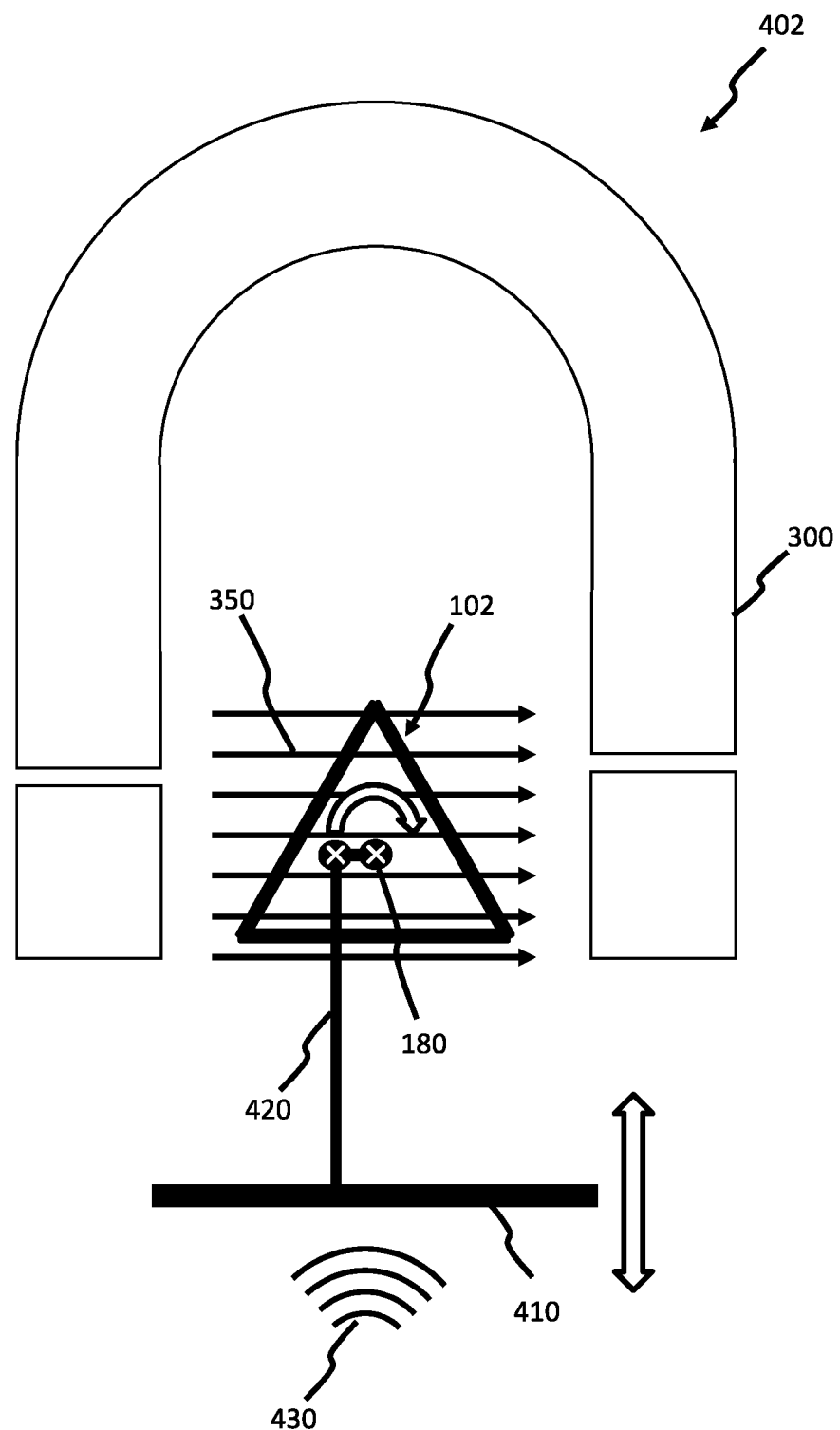
Figure 9:
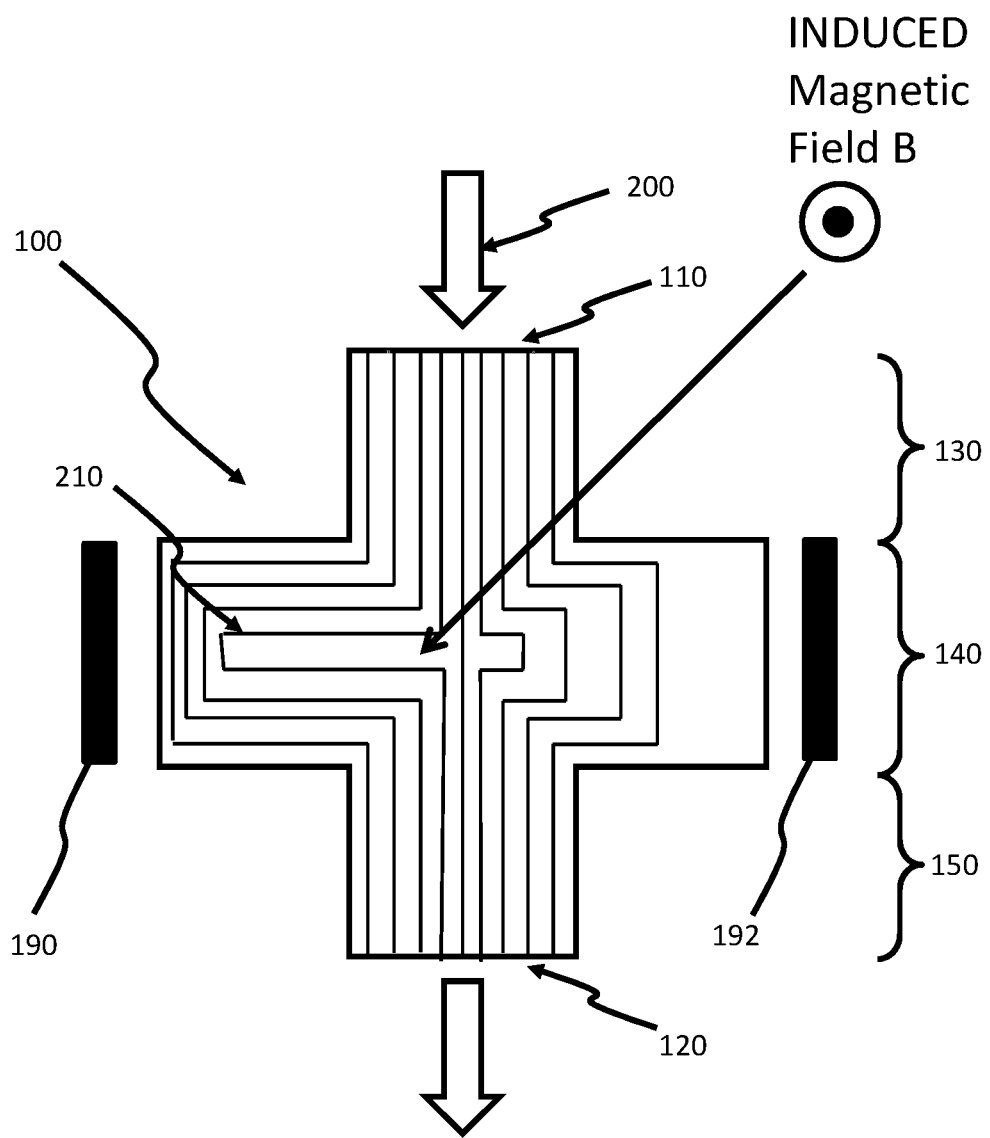
Figure 10:
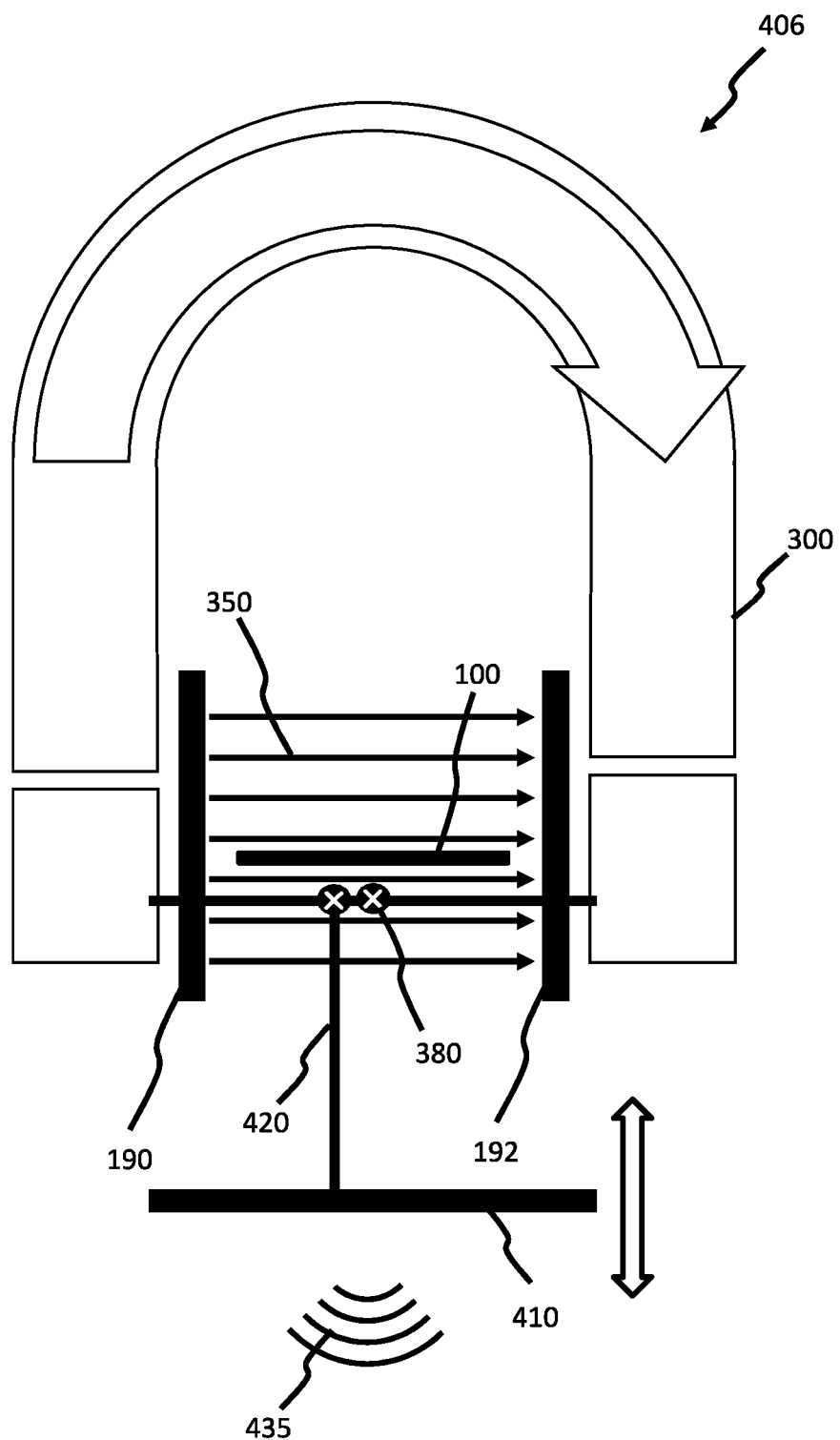
Figure 11:
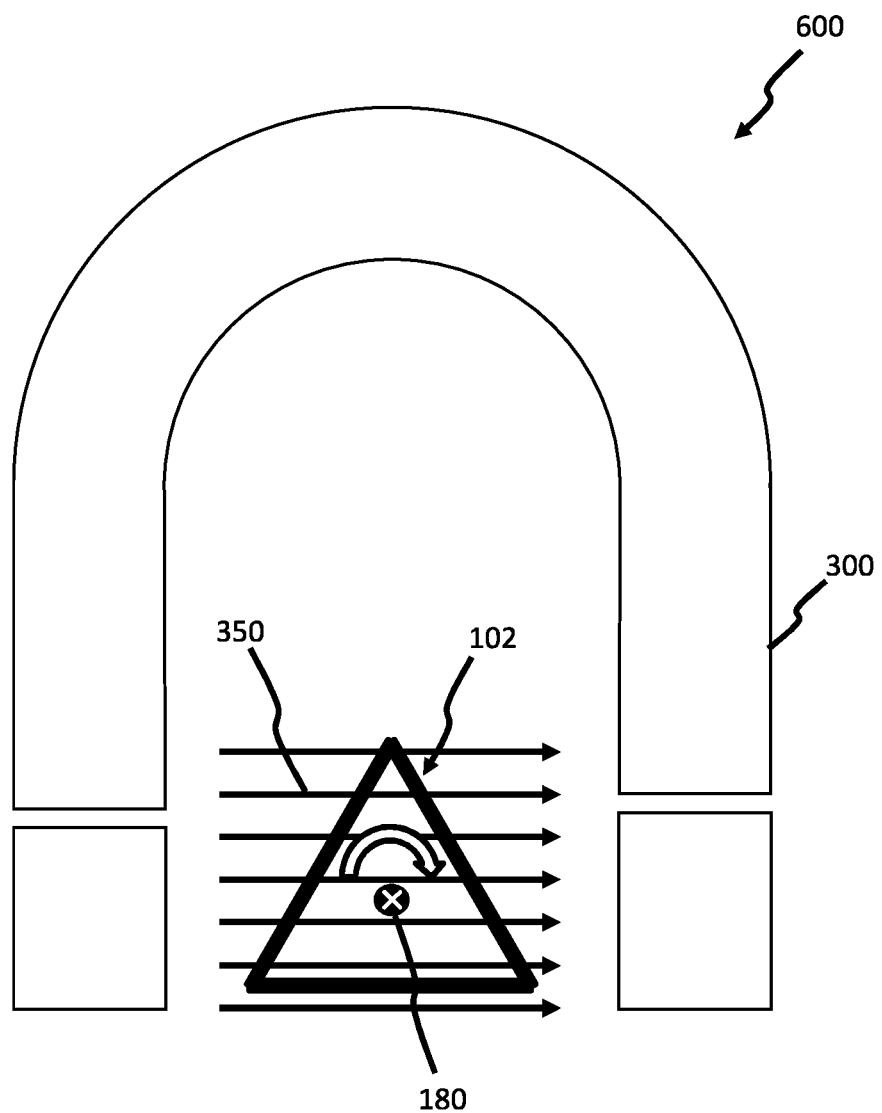
Figure 12:
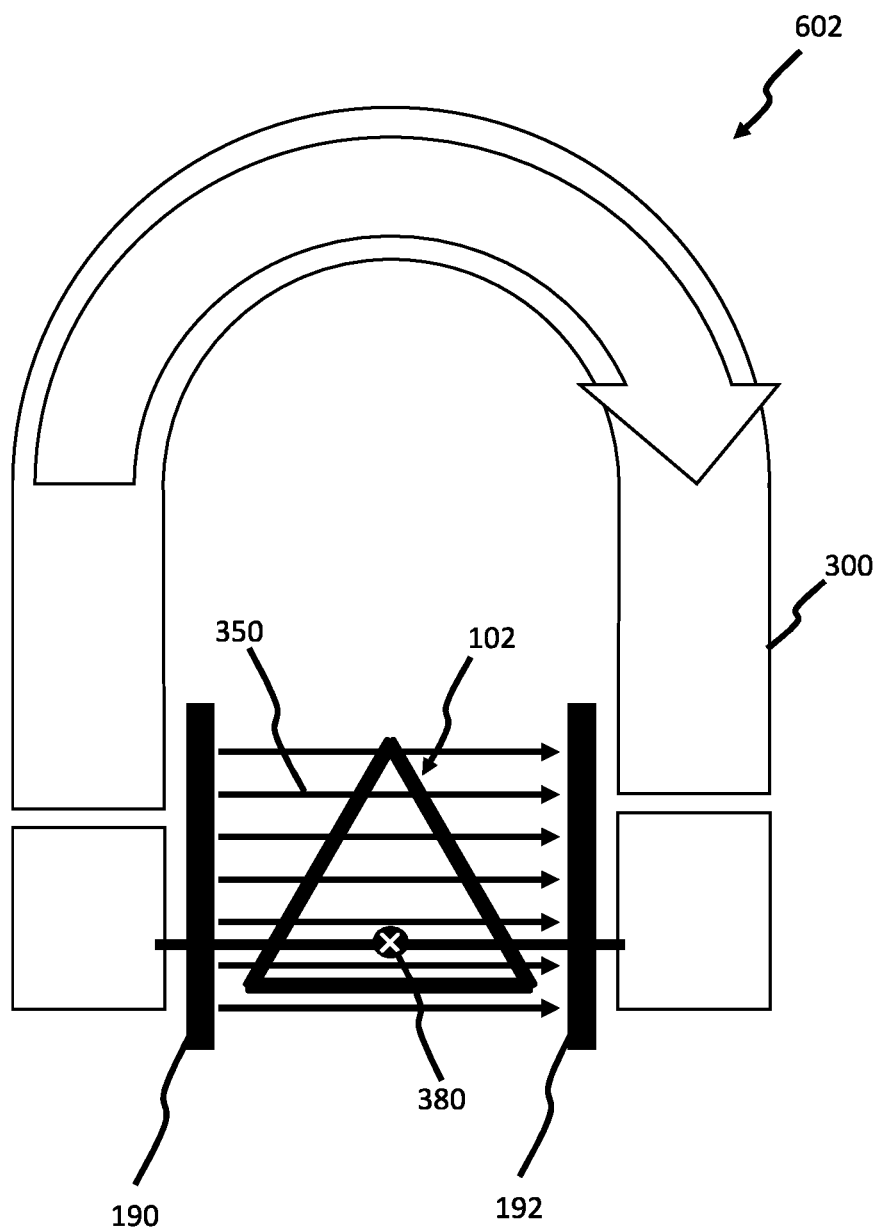
Figure 13:
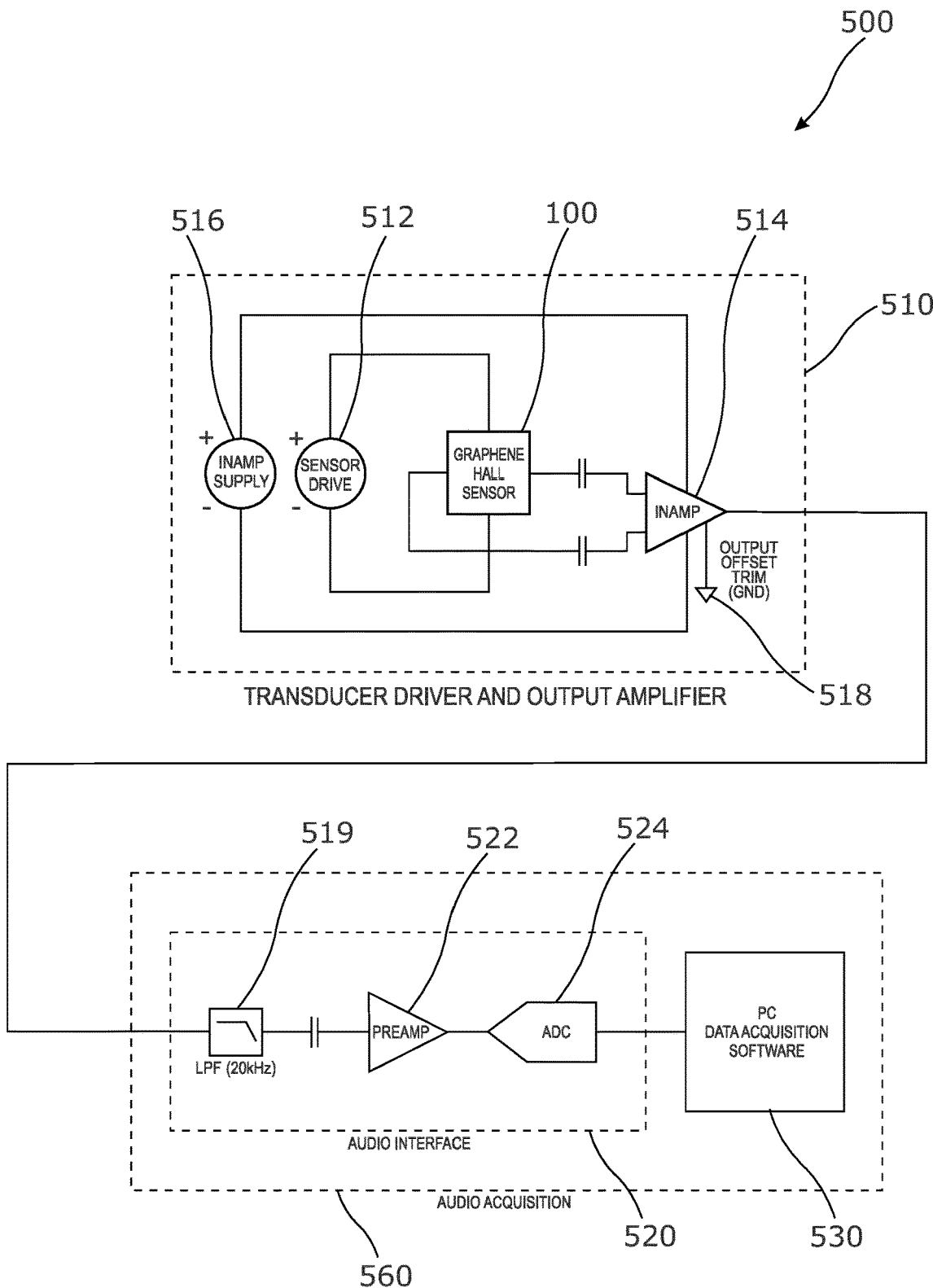
Figure 14:
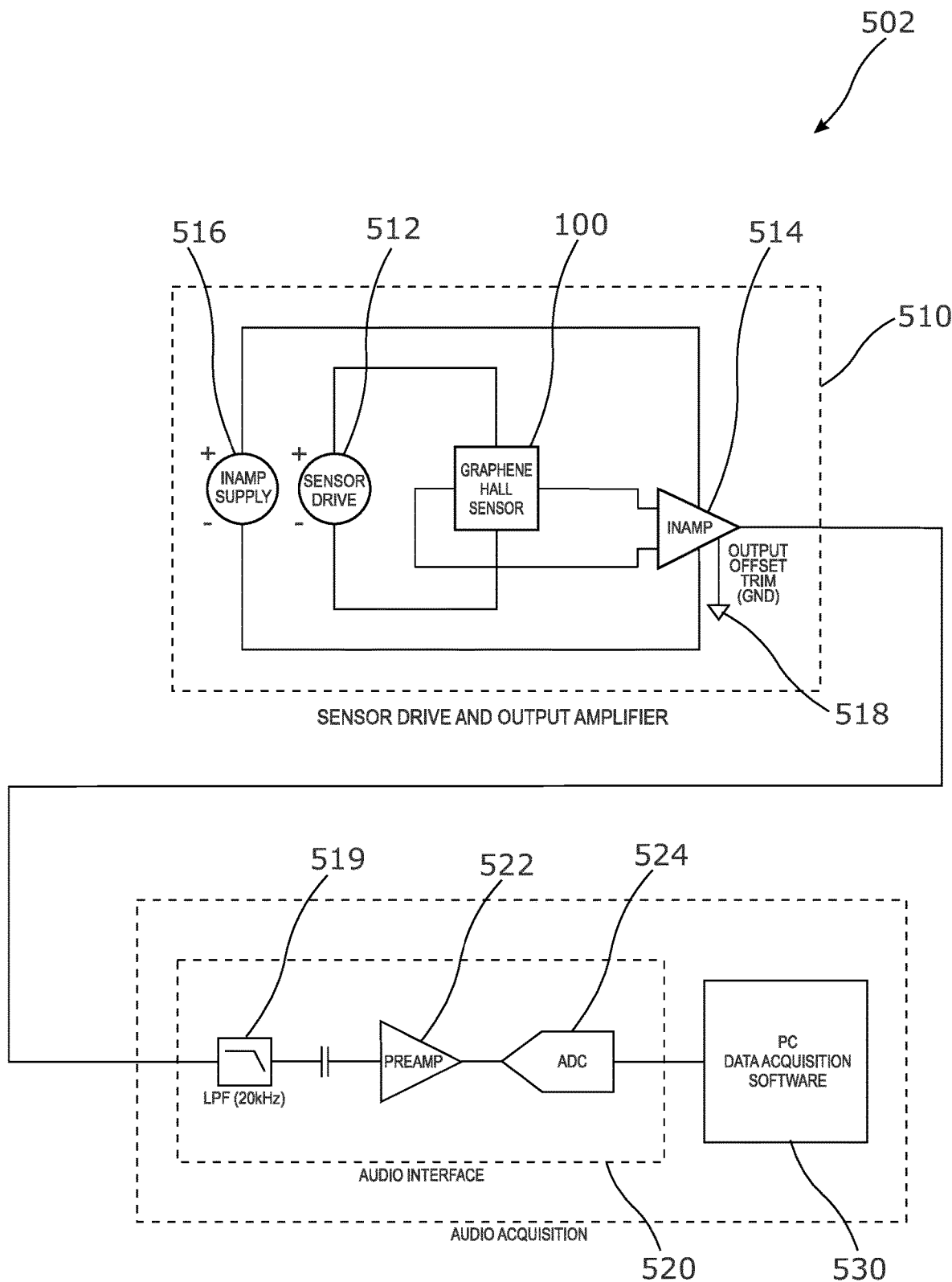
Figure 15:
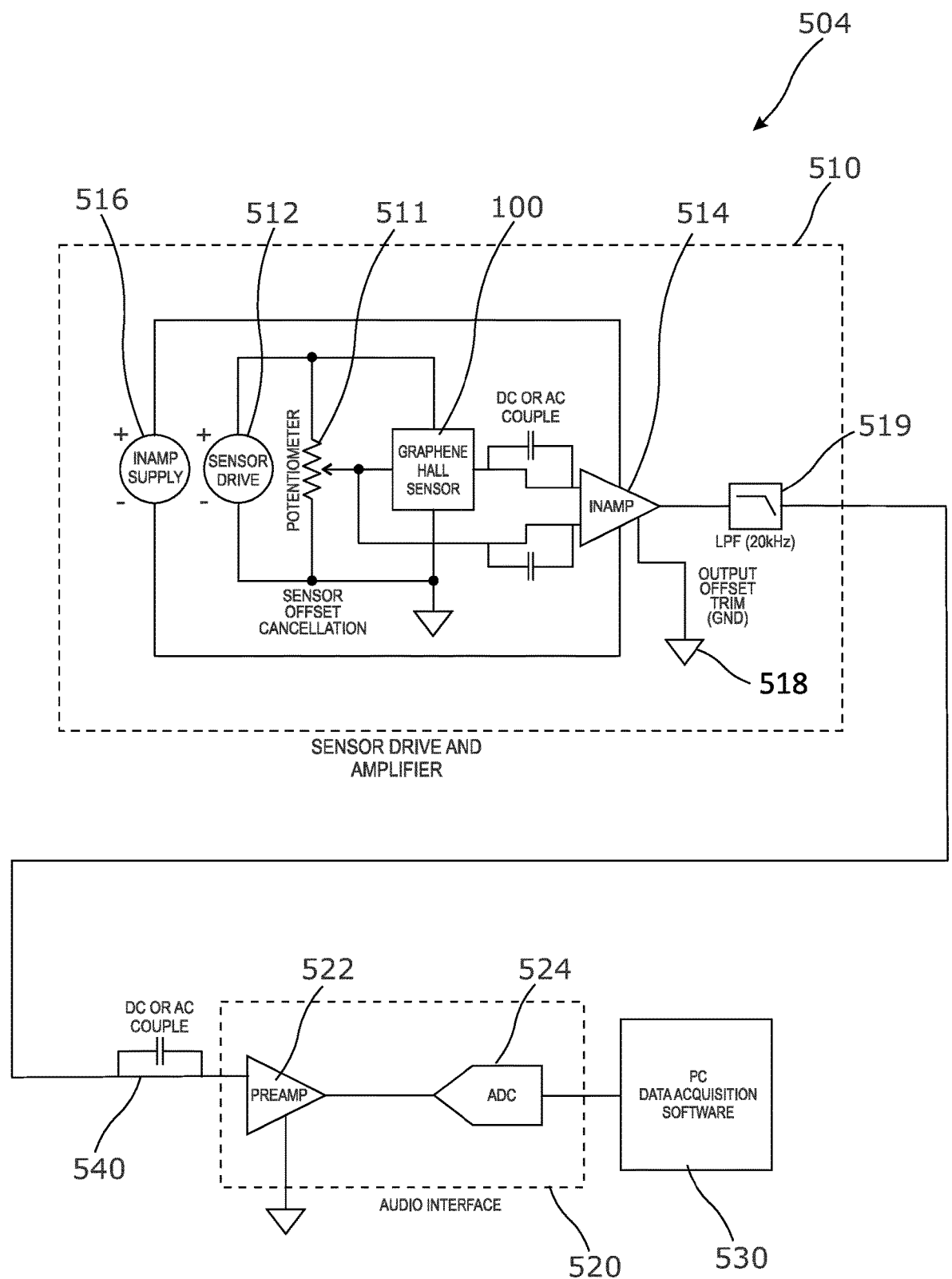
Figure 16:
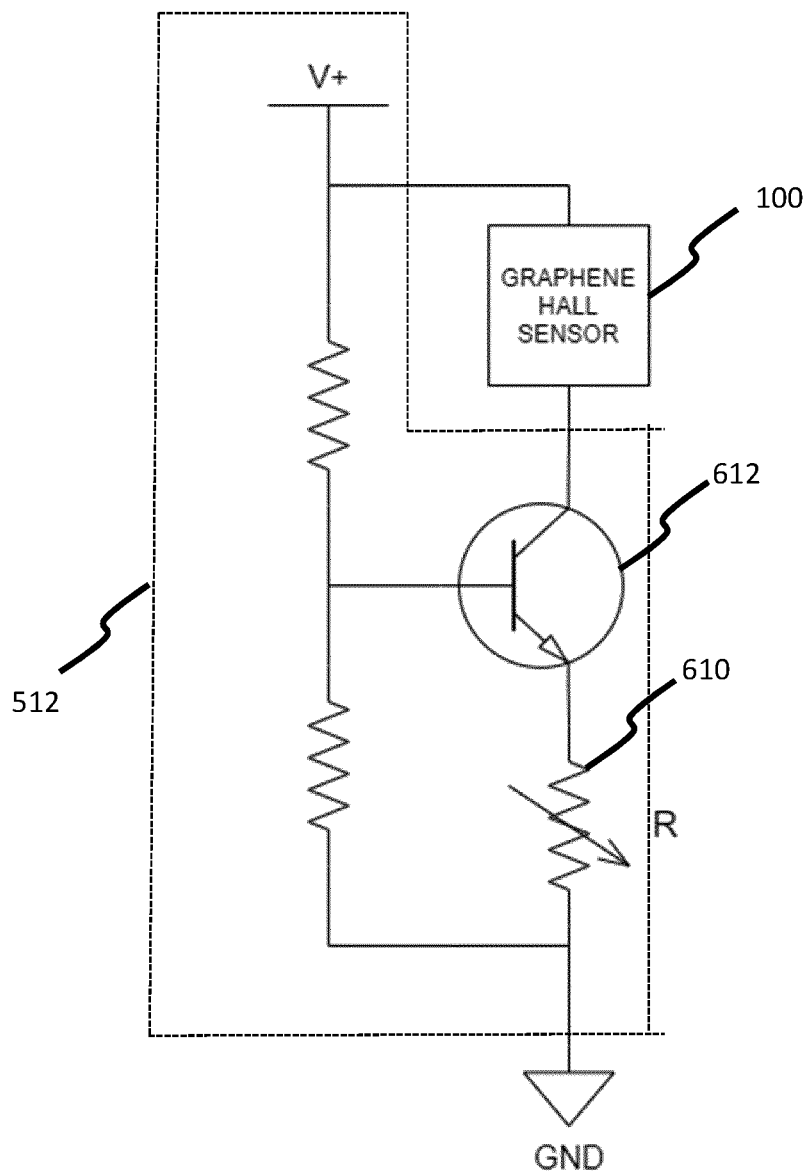
Figure 17:
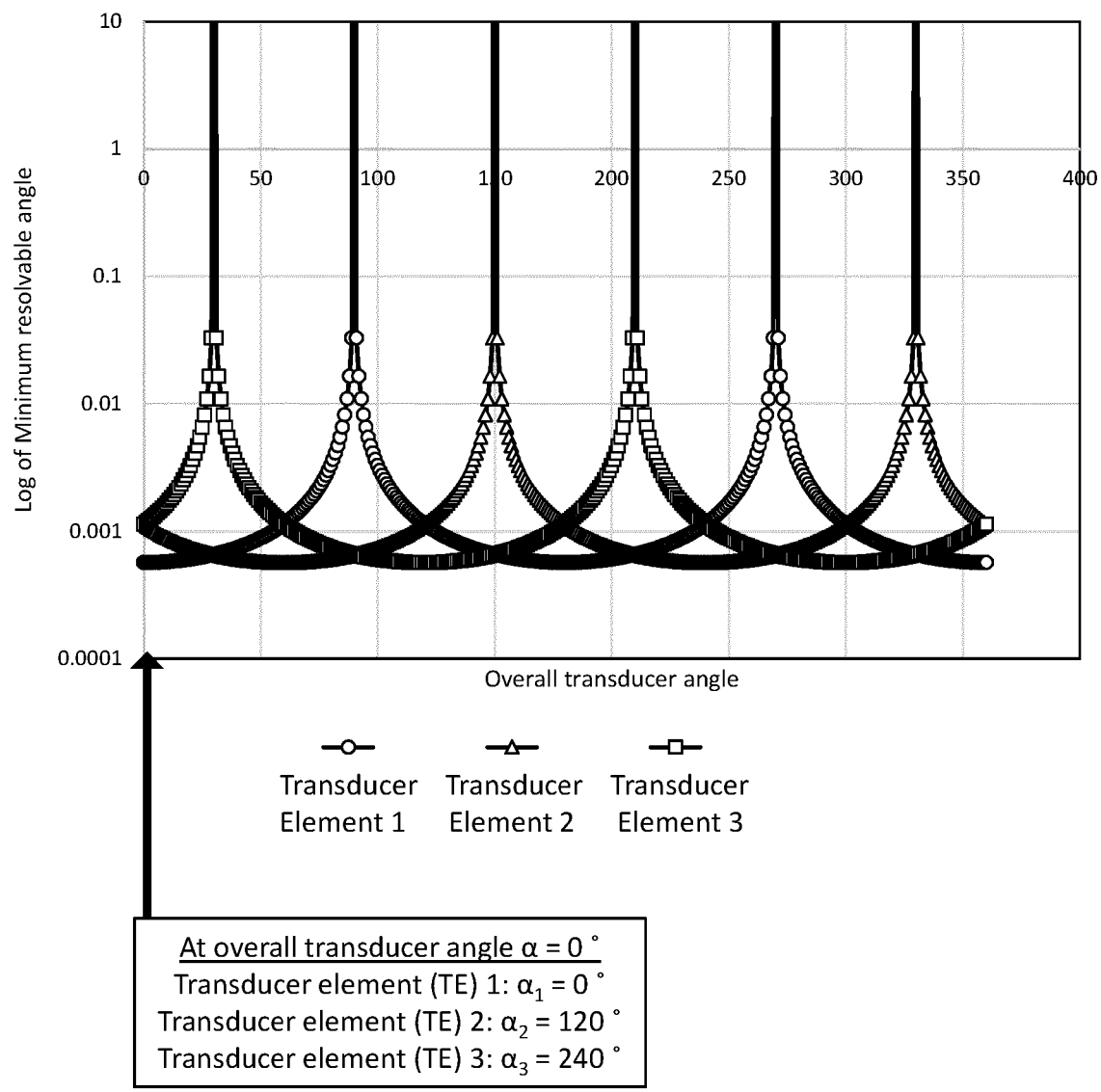
Figure 18:
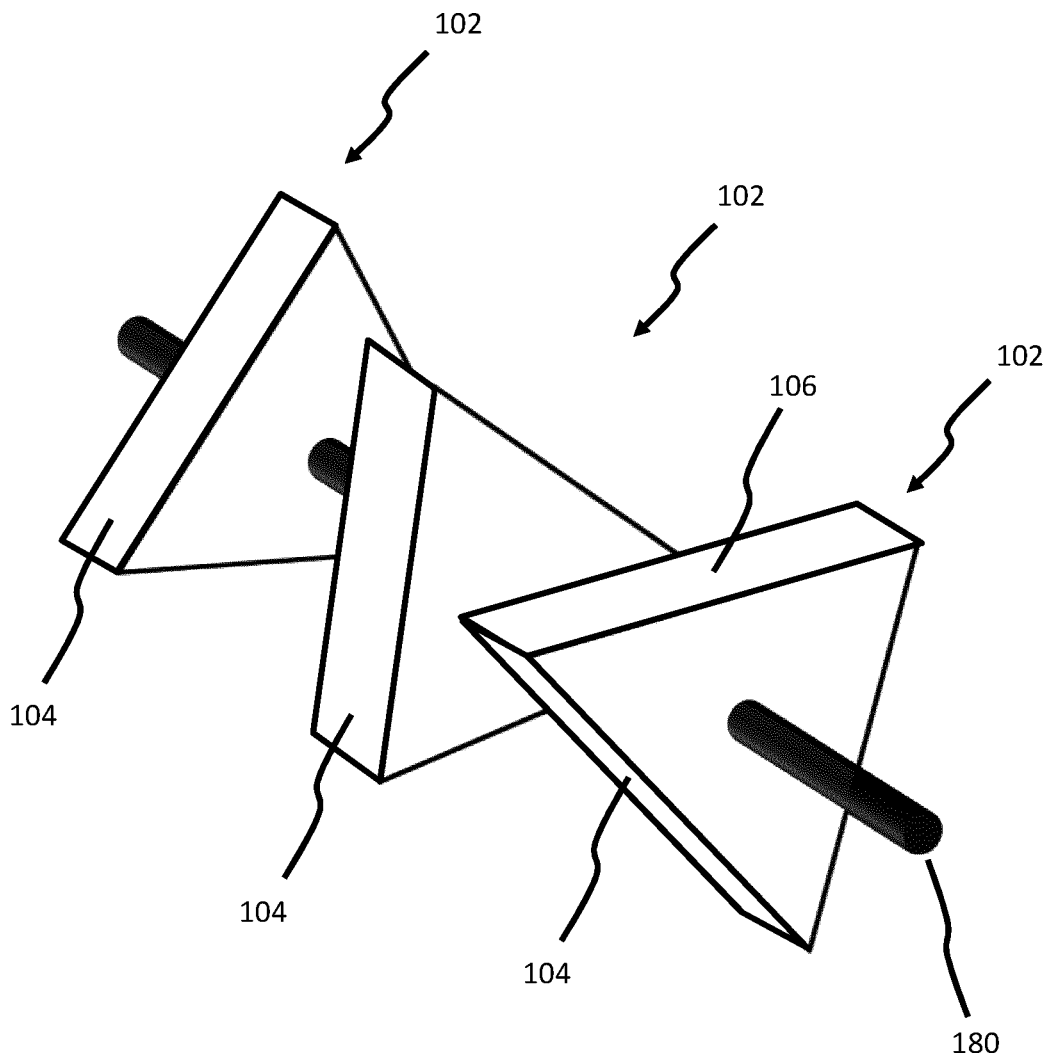

FIG. 6 shows a schematic view of a graphene sheet arrangement comprising three graphene sheets (three transducer elements) distributed in an equilateral triangle and rotatably mounted so as to include within the rotational scope of all three graphene sheets both a position in which the graphene sheet sits parallel to the magnetic field lines and a position in which the graphene sheet sits perpendicular to the magnetic field lines;

FIG. 7 shows a schematic view of a graphene sheet arrangement comprising three graphene sheets (three transducer elements) distributed in a star or windmill configuration and rotatably mounted so as to include within the rotational scope of all three graphene sheets both a position in which the graphene sheet sits parallel to the magnetic field lines and a position in which the graphene sheet sits perpendicular to the magnetic field lines;

FIG. 8 shows a schematic view of an embodiment of a transducer comprising the graphene sheet arrangement shown in FIG. 6 and deployed as an audio transducer, specifically a microphone;

FIG. 9 provides a schematic view that shows how a magnetic field may be induced in the graphene sheet of FIG. 1 when equal and opposite charges are stored on opposing plates either side of the graphene sheet;

FIG. 10 shows a transducer comprising the graphene sheet of FIG. 5 and deployed as an audio transducer, specifically a speaker;

FIG. 11 shows a schematic view of an embodiment of a transducer comprising the graphene sheet arrangement shown in FIG. 6 and deployed as a rotational encoder;

FIG. 12 shows a schematic view of an embodiment of a transducer comprising the graphene sheet arrangement shown in FIG. 6 and deployed as a motor;

FIG. 13 shows a schematic view of an electronic circuit for use with a graphene sheet in accordance with the transducers of the disclosure;

FIG. 14 shows a schematic view of an alternative electronic circuit to the one shown in FIG. 13;

FIG. 15 shows a schematic view of a further alternative electronic circuit to the ones shown in FIGS. 13 and 14;

FIG. 16 shows a current drive circuit for driving a current in the graphene sheet in the direction from top to bottom as shown in the orientation of FIG. 1;

FIG. 17 shows for the graphene sheet arrangement of FIG. 7 a logarithmic plot of the minimum resolvable angle for each of three graphene sheets versus the angle of each graphene sheet relative to the magnetic field lines; and FIG. 18 shows how a stacked arrangement of graphene sheet arrangements, each offset along the axis of rotation, which may be provided as part of a transducer in accordance with the disclosure.

DETAILED DESCRIPTION

The term "graphene sheet", as used herein, refers to one or more layers of graphene. Accordingly, the term graphene sheet may refer to a monolayer of graphene or to multilayer graphene (which may be termed a 'graphene layer structure') arranged in a laminar structure. Thus, graphene sheet refers to a graphene layer structure having from 1 to 10 monolayers of graphene. A monolayer of graphene on a substrate may be preferred.

The term "transducer element", as used herein, refers to the deployment of a graphene sheet to convert between electrical and kinetic energy and/or between kinetic energy and electrical energy.

The term "graphene sheet arrangement", as used herein, refers to a plurality of graphene sheets, each either monolayer or multilayer, wherein each graphene sheet in the graphene sheet arrangement is arranged in a different orientation relative to the other graphene sheets in the graphene sheet arrangement.

The term "transducer", as used herein, refers to a device comprising one or more transducer elements.

FIG. 1 shows a graphene sheet 100 having a cross-shape comprising a wide portion 140 located between a first narrow portion 130 and a second narrow portion 150. The graphene sheet 100 is shown with a current flow 200 through it from top 110 to bottom 120 of the graphene sheet 100. (Directional references such as top, bottom, left and right are not absolute and refer only when viewing in the orientation shown in FIG. 1.) In the absence of a magnetic field, current flow 200 is evenly distributed from left to right of the graphene sheet, in the orientation of FIG. 1. This even distribution is represented by the evenly distributed current flow lines 210 from left to right. (Note that the current flow lines 210 are particularly schematic.) The cross-shape of the graphene sheet 100 means that the current flow lines 210 become more distributed as the current passes through the wide portion 140 and less distributed as the current passes through the first and second narrow portions 130, 150. Both in the narrow portions 130, 150 and the wide portion 140, the current flow lines 210 are evenly distributed across the width of the graphene sheet. While the phenomena described are particularly apparent in a cross-shaped graphene sheet, a cross-shape is not essential.

Figure 2:
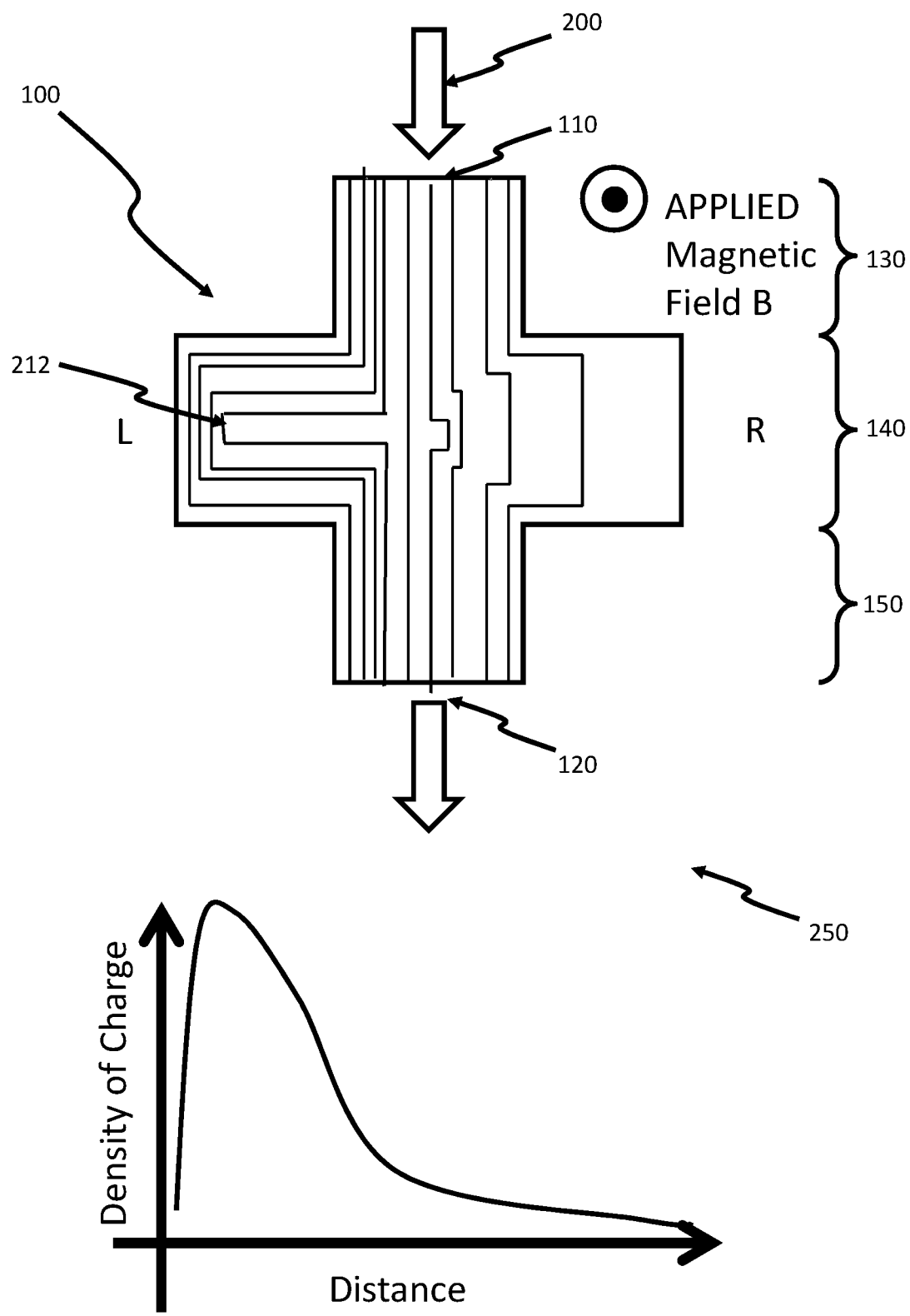

FIG. 2 shows the same graphene sheet 100 as FIG. 1 with a current flowing through it from top to bottom of the graphene sheet. (As with FIG. 1, directional references such as top, bottom, left and right are not absolute and refer only when viewing in the orientation shown in FIG. 2.) A magnetic field is present such that magnetic field lines are orthogonal to the plane of the graphene sheet 100. The effect of the magnetic field is to alter the charge distribution between left and right sides of the graphene sheet 100. In particular, the current density shifts to the left in the orientation of FIG. 2. This uneven distribution is represented by unevenly distributed current flow lines 212. (Note again that the current flow lines 212 are particularly schematic.) A schematic plot of the charge density profile is plotted beneath the graphene sheet. While the phenomena described are particularly apparent in a cross-shaped graphene sheet, a cross-shape is not essential.

These properties described in relation to FIGS. 1 and 2 can be deployed as a transducer comprising a graphene sheet 100 configured to receive a current flow whereby a charge density of the current flow is influenced by a magnetic field.

In particular, the relative angle between the magnetic field lines and the plane of the graphene sheet can be detected by measuring the electrical potential resulting from uneven charge density distribution.

Figure 3A:
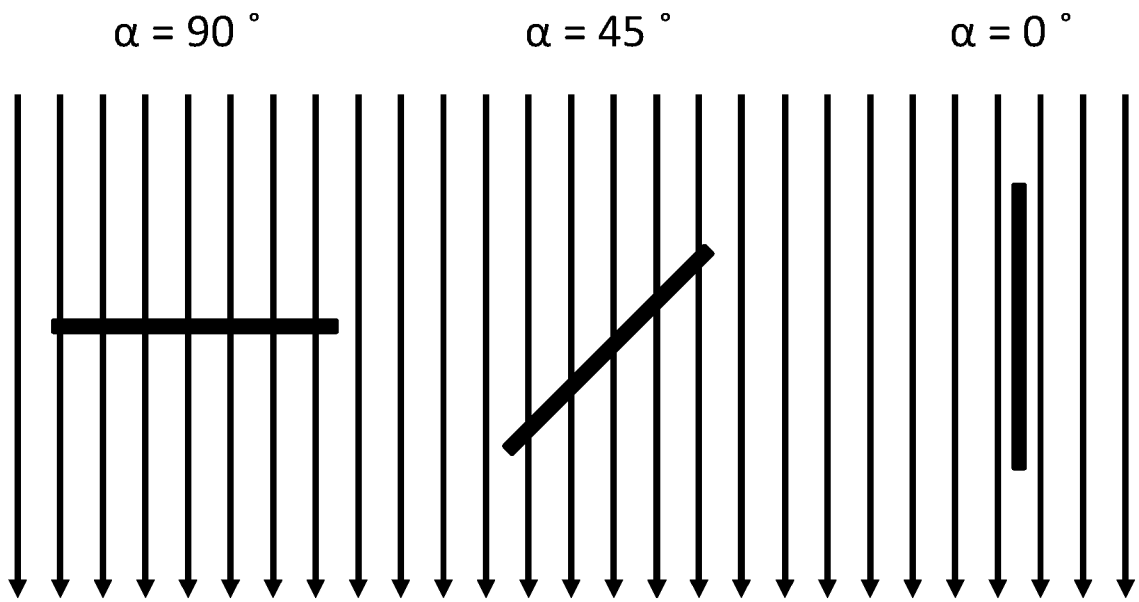
FIG. 3a shows a schematic view of a graphene sheet at 90° to the direction of the magnetic field, at 45° to the direction of the magnetic field, and parallel to the direction of the magnetic field.
Figure 3B:
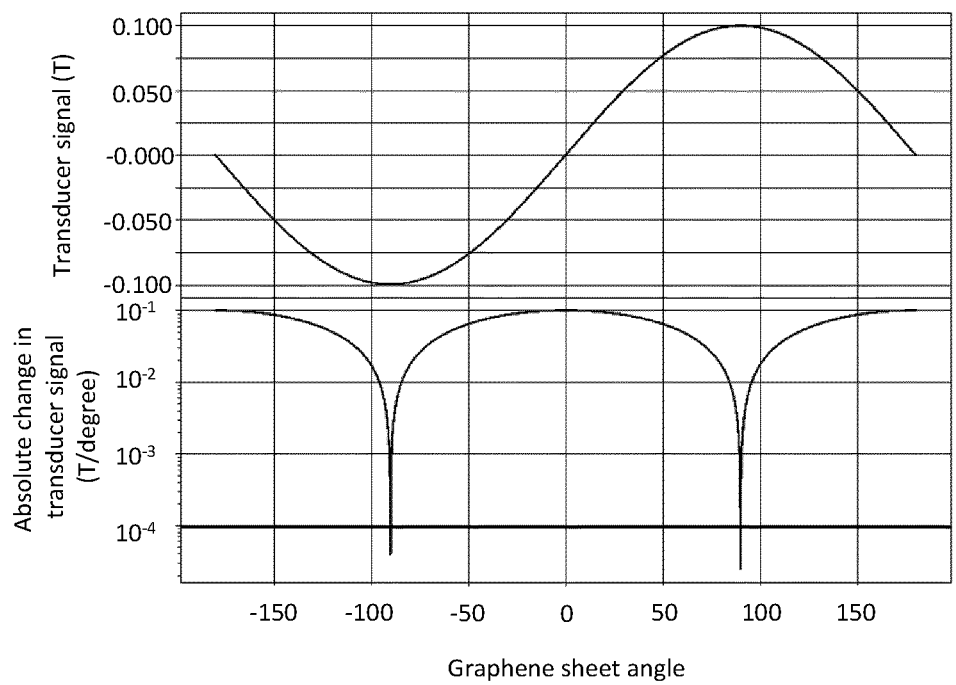
FIG. 3b shows a plot of (i) a function of measured electric potential versus angle and (ii) absolute change in the function of measured electric potential versus angle of graphene sheet relative to the magnetic field.

With reference to FIGS. 3a and 3b, where the magnetic field lines are perfectly orthogonal to the plane of the graphene sheet ($\alpha=90°$), the effect on current density profile is greatest (that is, the electrical potential is greatest) but the sensitivity to change in angle as the graphene moves out of perfect orthogonality (that is, the rate of change of electrical potential) is least.

By contrast, where the magnetic field lines are parallel to the plane of the graphene sheet ($\alpha=0°$), there is no effect on the current density profile (that is, there is no electrical potential generated) but the sensitivity to change in angle as the graphene moves out of perfect parallelism (that is, the rate of change of electrical potential) is greatest.

To generalise, absolute signal strength is proportional to $\sin(\alpha)$. However, change in signal strength is proportional to $\cos(\alpha)$. Thus signal strength is maximum when $\alpha=90°$ and zero when $\alpha=90°$. But change in signal strength with angle is minimum when $\alpha=90°$ and maximum when $\alpha=0°$. Therefore, the transducer element is at its most sensitive at $\alpha=0°$.

Measuring electrical potential in the graphene sheet provides an output that varies based on $\alpha$.

Sensor signal (T) in FIG. 3b is determined relative to the sensitivity of the sensor. This may be V/T, or V/AT where A is the current drive, or V/VT (output volts per Tesla field strength).

The applicant has determined that it is possible to resolve the magnetic strength down to $5\,e^{-5}$ T RMS. This was shown for a temperature of 295 K, a magnetic field strength of 1 T, a bias current of 10 µA, a total resistance of 10 kΩ and using a graphene sheet in a package having dimensions of approximately 10 mm×10 mm×3 mm with a sensitive area of 0.03 $cm^2$ and a sensitivity of 1,000 V/AT.

Thus, if the rotation frequency is less than electronics noise Bandwidth frequency, the sensitivity of the device enables the detection of rotations as small as 0.05°. In other words, it is possible to detect a change in angle between $\alpha=0°$ and $\alpha=0.05°$. By reducing the total resistance of the graphene (determined by the purity of the graphene) the minimum detectable rotation can be reduced.

Figure 4:
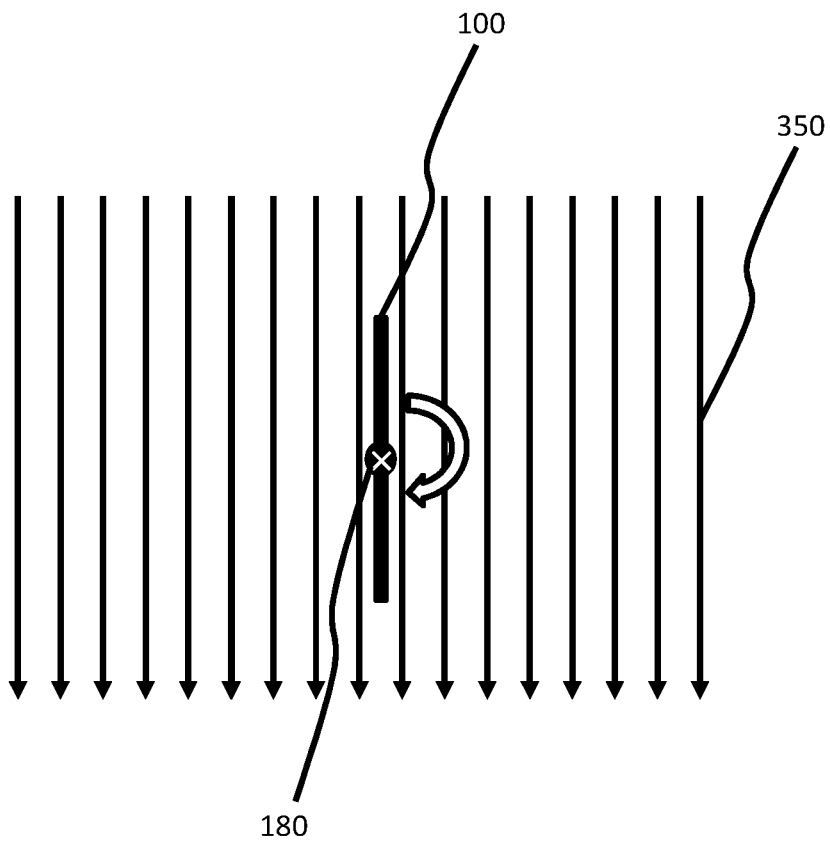
FIG. 4 shows a schematic view of a graphene sheet (a single transducer element) rotatably mounted about an axis that allows rotation of the graphene sheet so as to include within its rotational scope both a position in which it sits parallel to the magnetic field lines and a position in which it sits perpendicular to the magnetic field lines.

FIG. 4 shows a graphene sheet 100 like that of FIG. 1 mounted on an axel (having an axis of rotation 180) so as to allow rotation of the graphene sheet 100 between a plane that is parallel to the magnetic field lines 350 ($\alpha=0°$) and a plane that is perpendicular to the magnetic field lines 350 ($\alpha=0°$). In this way, measuring the effect on current density in the graphene sheet 100 (that is, electrical potential across the graphene sheet) enables angle to be inferred. Sensitivity to change in current density (and hence to change in angle) is greatest nearest to $\alpha=0°$.

FIG. 5 shows a transducer 400 in accordance with an embodiment of disclosure in which the graphene sheet 100 of FIG. 4 is mechanically coupled to a diaphragm 410 such that vibrations in the diaphragm 410 result in modest rotations in the graphene sheet 100. The transducer 400 comprises a magnet 300 (either a permanent magnet or an electromagnet) arranged to provide the magnetic field oriented relative to the axis of rotation of the rotatable graphene sheet 100 as described above in relation to FIG. 4.

Where the transducer 400 of FIG. 5 is calibrated such that the vibrations in the diaphragm 410 influence the rotational position of the graphene sheet 100 to a modest extent (e.g. up to 14° either side of α=0°) the electrical potential measured across the graphene sheet 100 may be considered substantially proportional to the vibrations experienced by the diaphragm 410. In this way, the transducer 400 of FIG. 5 can be deployed as a sensitive audio transducer.

In one mode, the audio transducer 400 of FIG. 5 can operate as a microphone, whereby the diaphragm 410 is configured to vibrate in response to vibrations 430 at audio frequencies that can be inferred by reading the electrical potential generated across the graphene sheet 100. In another mode, the audio transducer can operate as a speaker, as explained further below with reference to FIG. 10.

FIG. 6 shows a graphene sheet arrangement 102 comprising three graphene sheets 104, 106, 108 evenly distributed around an axis of rotation 112. In this example, the three graphene sheets 104, 106, 108 are arranged in an equilateral triangle. The graphene sheet arrangement 102 is rotatably mounted about its axis of rotation 112 so as to include within the rotational scope of all three graphene sheets 104, 106, 108 both a position in which the graphene sheet 104, 106, 108 sits parallel to the magnetic field lines 350 and a position in which the graphene sheet 104, 106, 108 sits perpendicular to the magnetic field lines 350.

In this way, the measured electrical potential in each of the three graphene sheets 104, 106, 108 can be interpreted in combination so as to exploit the fact when one or two of the graphene sheets 104, 106, 108 are in a rotational position resulting in poor sensitivity the remaining graphene sheet 104, 106, 108 will provide a result resulting in good sensitivity. The signals from the three graphene sheets 104, 106, 108 can be appropriately combined so as to provide increased resolution, as explained in more detail below.

FIG. 7 shows a second graphene sheet arrangement 103 comprising three graphene sheets 104, 106, 108. Like the FIG. 6 arrangement, the three graphene sheets 104, 106, 108 are evenly distributed around the axis of rotation 112. However, in place of an equilateral triangle arrangement (which might be labelled a "delta" arrangement) each graphene sheet 104, 106, 108 is arranged to project radially from the axis of rotation 112 (which might be labelled a "star" arrangement).

FIG. 8 shows a transducer 402 similar to that of FIG. 5 but with the single graphene sheet (single transducer element) substituted for a graphene sheet arrangement 102 having three graphene sheets 104, 106, 108 (three transducer elements) in a delta arrangement, the same as that shown in FIG. 6.

By providing three transducer elements, the transducer 402 of FIG. 8 is capable of accurately determining not only the extent of rotation of relatively small angles (up to 14° either side of α=0°) but of accurately determining the extent of rotation around the full extent of rotation about the axis of rotation 180.

(Note that while the entire figure set is schematic, the mechanical coupling 420 of FIG. 8 is particularly schematic. The mechanical coupling 420 may comprise a slider crank arrangement and/or a gear mechanism or any other suitable coupling elements.)

FIG. 9 shows the same graphene sheet 100 as shown in FIGS. 1 and 2 with a current flowing through it from top to bottom of the graphene sheet. (Again, directional references such as top, bottom, left and right are not absolute and refer only when viewing in the orientation shown in FIG. 9.) The graphene sheet 100 of FIG. 3 sits between a pair of electrical plates 190, 192 that are configured to hold an equal and opposite charge to each other. When the electrical plates 190, 192 are charged and the current flow 200 is flowing, a non-uniform magnetic field is induced in the centre of the graphene sheet 100.

FIG. 10 shows the FIG. 9 arrangement in the context of a transducer, specifically an audio transducer 406 deployed as a speaker 406. In this case, the magnet 300 is rotatable about a magnet axis 380. A charge present on electrical plates 190, 192 induces a magnetic field in the graphene sheet 100 such that the rotational position of the magnet (300) is influenced by the induced magnetic field. The rotational position of the magnet 300 changes with the charge on the electrical plates 190, 192. The magnet 300 is also rotationally coupled to a diaphragm 410. In this way, an electrical input that influences the charge on the electrical plates 190, 192 is output as audio waves 435 by the diaphragm 410. This is may not be immediately clear from the Figure, but it is important that the location of the electrical plates 190, 192 is such that the plates induce a magnetic field in the graphene sheet whilst not creating a magnetic field that would directly influence the position of the magnet.

A plate driver circuit (not shown) may be used to provide a potential between the electrical plates 190, 192.

The degree of accuracy provided by the graphene sheet arrangements comprising multiple (e.g. three) graphene sheets (that is multiple transducer elements) may be more than is required in an audio transducer. However, arrangements comprising multiple transducer elements, such as that shown in FIG. 8, may instead be deployed without a diaphragm as a high precision rotational encoder.

FIG. 11 shows the graphene sheet arrangement 102 of FIG. 6 deployed as a transducer, specifically a rotational encoder 600. Rotation of the graphene sheet arrangement 102 about the axis of rotation 180 in the magnetic field lines 350 causes current density in the graphene sheets of the graphene sheet arrangement 102 to be influenced (except when the angle of a graphene sheet is α=0°). Measurement of the current density in each of the three graphene sheets (that is, each of the three transducer elements) allows highly accurate results for rotational position of the graphene sheet arrangement 102.

Furthermore, since graphene is able to operate reliably at extremes of temperature and has a degree of immunity to radiation, its use may be applicable in more extreme conditions. For example, the trio graphene sheet arrangement may be deployed as a rotational position sensor on spacecraft or on instruments for use on other planets (e.g. Mars) or satellites (e.g. the moon), where precision measurements may be paramount.

FIG. 12 shows the graphene sheet arrangement 102 of FIG. 6 deployed as a transducer 602, specifically a motor 602. The motor 602 has parallels with the speaker 406 of FIG. 10.

FIG. 13 shows an arrangement of hardware 500 for driving and acquiring an output from a graphene sheet 100 such as that shown in FIGS. 1 and 2 and providing an audio signal per the microphone embodiment of FIG. 5. In a microphone comprising graphene sheet arrangements having more than one graphene sheet, such as that shown in FIG. 8, the hardware may be duplicated for each graphene sheet.

The hardware 500 comprises a transducer driver and amplifier circuit 510 and audio acquisition features 560. The audio acquisition features 560 comprise an audio interface 520 and a data acquisition system 530.

The transducer driver and amplifier circuit 510 comprises a supply 512 used to drive the graphene sheet 100 by generating a current flow in one orientation of the graphene sheet 100 (referencing FIG. 1, this current flows from top to bottom in the illustrated orientation).

The transducer driver and amplifier circuit 510 circuit comprises an amplifier 514 and an amplifier supply 516 which is used to drive the amplifier 514. The amplifier circuit 510 may further comprise a ground connection 518 that facilitates removal of an offset.

The audio acquisition features 560 may comprise a low pass filter 519 configured to eliminate frequencies that fall outside the audio spectrum. For example, the filter may filter to the audio band at 20 kHz, or similar.

The audio interface 520 may comprise a pre-amplifier 522 and an analogue digital converter 524.

The data acquisition system 530 may comprise a PC or other processor configured to receive an output from the analogue digital converter 524. In the event of use of the transducer as an audio transducer, the data acquisition system 530 may process the output from the analogue digital converter 524 in order to provide an audio signal or audio file.

In the arrangement shown in FIG. 13, there is AC coupling between the graphene sheet 100 and the amplifier 514.

In an alternative arrangement, shown in FIG. 14, there may be DC coupling in place of AC coupling.

FIG. 15 shows the arrangements of FIGS. 13 and 14 and also including a sensor offset cancellation functionality 511.

FIG. 16 shows a possible arrangement for the supply 512 comprising a transistor 612 and a potentiometer 610 for offset cancellation. Other constant current supply implementations are possible.

The transducer driver and amplifier circuit 510 shown in FIGS. 13 to 15 may be equally applicable to a non-audio transducer though a non-audio transducer would of course not require the audio acquisition features 560. Instead, a non-audio transducer in the form of a rotational encoder may comprise alternative data acquisition features.

Further alternative transducer drivers may be implemented in an audio transducer deployed as a speaker or in a non-audio transducer deployed as a motor. While the details of such drivers are not set out in detail, the skilled person would have no difficulty in implementing known drivers in such transducers.

FIG. 17 shows the minimum angle resolvable for each of three graphene sheets (three transducer elements) in a transducer such as that shown in FIG. 11.

In the nomenclature of FIG. 17, an overall transducer angle of $\alpha=0°$ is when $\alpha_1=0°$, $\alpha_2=120°$ and $\alpha_3=240°$.

By using the combination of three signals (one from each transducer element) it is possible to calculate with a considerably degree of confidence the rotational position of the transducer between $\alpha=0°$ and $\alpha=360°$.

Resolving the overall transducer angle may involve a number of steps.

In a first aspect of the process, a transducer element angle reading ($\alpha_1$, $\alpha_2$, $\alpha_3$) is determined for each transducer element (104, 106, 108). The output for each transducer element is a voltage proportional to the sine (−1.0 to 1.0) of the angle ($\alpha$) of the magnetic field to the plane of the transducer element. This results in a two-fold ambiguity since there is not a one to one mapping of angle of the transducer element to the output voltage. There are two possible angles for each output voltage since, for one full period of a sine wave, the same voltage arises at two different angles.

However, the ambiguity can be resolved by considering the output from all three transducer elements. While, in the illustrated arrangements, there are three transducer elements, it would equally be possible to resolve the ambiguity with only two transducer elements.

For a transducer comprising three transducer elements, each separated by 120 degrees (such as that shown in FIGS. 6 and 7), the steps are:

a/Use arcsine function to calculate the principle and secondary angles for the each transducer element (transducer element angle);

b/Remove the offset (0, 120 and 240 degrees) from the principle and secondary transducer element angles to arrive at the transducer overall angle;

c/Use the modulo operator to restrict the principle and secondary angles for each transducer element to the range 0 to 360 degrees;

d/Determine the correct transducer overall angle for each transducer element for each angle by considering when transducer element responses are expected to be the same due to the fixed angles between the transducer elements.

In a second aspect of the process, it is an object to determine a best transducer overall derived angle ($\alpha$) by using a combination of the angles from each transducer element.

The transducer element output (V_out) is proportional to the sine of the transducer element angle ($\alpha_n$) to the magnetic field. Setting the maximum output for each device to 1 V and assuming a uniform magnetic field of 1 T, then V_out=sin ($\alpha$). The change in voltage with a change in Theta is dV_out=cos ($\alpha$)*d$\alpha$.

The minimum resolvable signal for each transducer element (V_noise) depends on the electrical noise floor (which will depend on sampling bandwidth). Setting the signal to noise to 1, V_out/V_noise=1=cos ($\alpha$)*d$\alpha$/V_noise. So the minimum resolvable angle will be d$\alpha$=V_noise/cos ($\alpha$). In other words, there is a large change of signal for small rotations, when the angle to the field is very small. At high angles (perpendicular) there is no change in signal for a small rotation.

Given the first aspect of the process, it is conceptually straightforward to obtain a highly accurate measure of the transducer overall angle ($\alpha$) by determining the weighted average of the three transducer element angles ($\alpha_1$, $\alpha_2$, $\alpha_3$). A natural weighting is 1/d$\alpha$**2.

So the normalised weighting for transducer element 1 is:

$$\text{Weight\_Theta\_1}=(\cos \text{Theta1})^{}2/((\cos \text{Theta1})^{}2+(\cos \text{Theta2})^{}2+(\cos \text{Theta3})^{}2).$$

The denominator appears to be a constant.

The limit on the minimum resolvable angle is determined by the electronic noise floor of the electronics.

Varying the noise floor in the calculator changes the expected minimum resolvable angle. For a relative noise floor of 0.00001, the minimum resolvable angle is 0.0006 degrees. (This assumes a very large electronic sampling time.) Noise and sampling time can be selected for any particular application in order to arrive at an appropriate level of precision for the application.

While the disclosure has focused on transducers having either a single transducer element or a trio of transducer elements, the disclosure is not limited to such arrangements. In particular, embodiments having different numbers of transducer elements (including two transducer elements) also fall within the scope of the disclosure. Where there is more than one transducer element, it is necessary for increased resolution for each transducer element to have a different angle to the magnetic field lines. Otherwise, the contribution of additional transducer elements does not add to the sensitivity of the combination. In an arrangement of two transducer elements it may be, for example, that the first and second transducer elements are offset by 90° such that when one is providing minimum sensitivity, the other is providing maximum sensitivity. However, other angle offsets are contemplated and would fall within the scope of the disclosure.

In embodiments comprising more than one transducer element, there is no requirement for the transducer elements to be axially in line with one another. Indeed, they may be axially offset from one another.

FIG. 18 discloses a specific arrangement of multiple transducer elements stacked in a direction parallel to the axis of rotation. In the FIG. 18 arrangement, each level in the stack comprises three transducer elements 104, 106, 108 in a delta formation around the axis 180. There is an offset angle between the delta formation in each level in the stack relative to the delta formation in each other level in the stack. In this way, the precision of the transducer may be increased further since there are a total of nine transducer elements, each at a different angle.

The stacking arrangement does not necessarily require a delta arrangement of transducer elements at each level in the stack. Indeed, there may be only one transducer element at each level in the stack. Or there may be more than one transducer element at each level in the stack, for example there may be two or three transducer elements at each level in the stack distributed about the axis.

The invention claimed is:

1. A transducer comprising:
a primary element comprising a magnet configured to provide a magnetic field within a magnetic zone, the magnetic field extending in a magnetic field direction;
a secondary element comprising a first graphene sheet located within the magnetic zone;
a static portion; and
a rotating portion configured to rotate about an axis of rotation relative to the static portion;
wherein the rotating portion comprises a first one of a set comprising the primary element and the secondary element; and wherein the static portion comprises a second one of the set; and
wherein an axis of rotation of the rotating portion is such that:
in a first position of the static portion relative to the rotating portion, the first graphene sheet lies in a first plane that is parallel to the magnetic field direction; and
in a second position of the static portion relative to the rotating portion, the first graphene sheet lies in an offset plane that is at an angle to the first plane about the axis of rotation;
such that:
on deployment of the transducer in a first mode, movement of the rotating portion relative to the static portion causes an electrical potential to be generated in the first graphene sheet thereby converting rotational kinetic energy into electrical potential; and/or
on deployment of the transducer in a second mode, electrical potential in the first graphene sheet causes rotation of the rotating portion relative to the static portion thereby converting electrical potential into rotational kinetic energy.

2. The transducer of claim 1 wherein the secondary element further comprises:

a second graphene sheet having a fixed position relative to the first graphene sheet, wherein the second graphene sheet lies in a second plane and wherein the first and second planes are offset with respect to one another about the axis of rotation.

3. The transducer of claim 2 wherein the secondary element further comprises:
a third graphene sheet having a first position relative to the first and second graphene sheets, wherein the third graphene sheet lies in a third plane.

4. The transducer of claim 3 wherein a cross-section through the first, second and third planes forms a delta formation centred on the axis of rotation.

5. The transducer of claim 4 wherein:
the first graphene sheet is offset from the second graphene sheet by an angle of 60°;
the second graphene sheet is offset from the third graphene sheet by an angle of 60°; and
the third graphene sheet is offset from the first graphene sheet by an angle of 60°.

6. The transducer of claim 3 wherein a cross-section through the first, second and third planes forms a star formation centred on the axis of rotation.

7. The transducer of claim 6 wherein:
the first graphene sheet is offset from the second graphene sheet by an angle of 120°;
the second graphene sheet is offset from the third graphene sheet by an angle of 120°; and
the third graphene sheet is offset from the first graphene sheet by an angle of 120°.

8. The transducer of claim 3 further comprising a fourth graphene sheet that is axially offset.

9. The transducer of claim 1, wherein the transducer is an audio transducer, the audio transducer further comprising:
a diaphragm having a rest position and configured to vibrate about the rest position in response to sound waves;
a mechanical linkage between the diaphragm and the rotating portion;
such that:
the rotating portion rotates in response to deviation of the diaphragm from the rest position; and
the diaphragm deviates from the rest position on rotation of the rotating portion.

10. The audio transducer of claim 9 wherein the magnetic field has a magnetic field strength in the region of 0.3 T.

11. The transducer of claim 1 further comprising:
either: (a) a current driver configured to supply a current to the graphene sheet in a first direction;
or: (b) a voltage driver configured to apply a voltage across the graphene sheet in a first direction;
and: a reader circuit configured to read a potential difference across the graphene sheet in a second direction perpendicular to the first direction and provide an output signal.

12. The transducer of claim 11 wherein the reader circuit comprises an amplifier configured to amplify the output signal.

13. The transducer of claim 11 further comprising an analogue digital converter configured to convert the output signal to a digital output signal.

14. The transducer of claim 11 wherein the current driver is configured to supply a current of between 10 pA and 100 mA, preferably between 10 pA and 50 mA, more preferably between 0.01 mA and 0.5 mA.

15. The transducer of any of claim 1,
wherein the secondary element further comprises:

a second graphene sheet having a fixed position relative to the first graphene sheet, wherein the second graphene sheet lies in a second plane and wherein the first and second planes are offset with respect to one another about the axis of rotation;

the transducer further comprising:
   either: (a) a current driver configured to supply a current to the graphene sheet in a first direction;
   or: (b) a voltage driver configured to apply a voltage across the graphene sheet in a first direction;
   and: a reader circuit configured to read a potential difference across the graphene sheet in a second direction perpendicular to the first direction and provide an output signal;
wherein there is provided, for each of the graphene sheets:
   either (a) a current driver;
   or: (b) a voltage driver;
   and a reader circuit for each of the graphene sheets wherein each reader circuit provides its respective output signal.

16. The transducer of claim 15 further comprising a processor configured to process the respective output signals in order to resolve a unique angle of each of the graphene sheets relative to the magnetic field direction.

17. The transducer of claim 1 wherein the magnetic field has a magnetic field strength of between −30 T and 30 T, preferably between −1.0 T and 1.0 T.

18. The transducer of claim 1 comprising a pair of electrical plates on either side of the or each graphene sheet configured such that a potential difference between the or each pair of electrical plates results in the induction of a magnetic field in the graphene sheet located between the or each pair of electrical plates.

* * * * *